Patented Sept. 15, 1942

2,295,665

UNITED STATES PATENT OFFICE 2,295,665

PROCESS FOR THE MANUFACTURE OF DIBROMOFLUORANTHENES

Walter Kern, Sissach, and Theodor Holbro and Richard Tobler, Riehen, Switzerland, assignors to the firm Society of Chemical Industry in Basle, Basel, Switzerland No Drawing. Application May 23, 1939, Serial No. 275,326. In Switzerland May 28, 1938

2 Claims. (Cl. 260—649)

This invention relates to the manufacture of dihalogenfluoranthenes by treating fluoranthene with a halogenating agent in presence of an indifferent dispersing agent, the boiling point of which exceeds that of carbon bisulfide.

As halogenating agent there may be used for example chlorine, sulfurylchloride or particularly bromine and as an indifferent dispersing agent, the boiling point of which exceeds that of carbon bisulfide, and is preferably also above 100° C., for example chlorobenzene, dichlorobenzene, trichlorobenzene, tetrachlorethane and especially nitrobenzene. Amongst the aforementioned agents tetrachlorethane possesses the lowest boiling point slightly above 130° C. In different dispersing agents are such agents which are not changed or not essentially changed by halogenating agents, The halogenation may occur with advantage at a low temperature, for example ordinary temperature, in presence or absence of a halogen carrier.

In the course of the halogenation, the halogenated fluoranthene separates in larger proportion from the mixture by suitable selection of the proportions. It is advantageous after the substantially completed halogenation and if desired after separating the hydrogen halide formed in the halogenation, for example by passing a current of air through the mass to heat the mixture until the product of halogenation which has separated has passed into solution and then to allow the solution to cool.

The process of the invention gives essentially better yields of dihalogenfluoranthene, for instance of dibromofluoranthene than are obtainable by the known processes; these dihalogenation products are obtained in such a degree of purity that they can be used directly for various reactions.

The following examples illustrate the invention, the parts being by weight:

Example 1

20.2 parts of fluoranthene are dissolved in 180 parts of nitrobenzene and there are added by drops while stirring 35 parts of bromine. After 24 hours the whole is filtered and the solid matter washed with alcohol and dried. In this manner there is obtained with a yield of 67 per cent feebly yellow dibromofluoranthene melting at 190–200° C. By recrystallization from chlorobenzene the pure dibromofluoranthene of a melting point of 204° C. is obtained with a yield of 51 per cent.

By analogously brominating 20.2 parts of fluoranthene in 240 parts of nitrobenzene, dibromofluoranthene melting at 194–200° C. is obtained with a yield of 60 per cent.

Example 2

20.2 parts of fluoranthene are dissolved in 180 parts of nitrobenzene and there are added by drops to the solution to which 0.05 part of iodine has been added 35 parts of bromine while stirring. After 24 hours the whole is filtered and the solid matter washed with alcohol and dried. The yield of crude dibromofluoranthene of melting point 190–200° C. amounts to 67 per cent.

Similar results are obtained by brominating in presence of iron powder, iodine and iron powder, ferric chloride or antimonypentachloride as a catalyst.

Example 3

20.2 parts of fluoranthene are dissolved in 165 parts of chlorobenzene and there are added to the solution by drops and while stirring 35 parts of bromine. After 24 hours the whole is filtered, the solid matter is washed with alcohol and dried. The yield of crude dibromofluoranthene amounts to 68 per cent. The melting point is 186–197° C.

If instead of chlorobenzene ortho-dichlorobenzene or trichlorobenzene or tetrachlorethane is used as the dispersing agent or solvent a 62 per cent yield of dibromofluoranthene of melting point 190–198° C. or 51 per cent of dibromofluoranthene of melting point 196–201° C. or 63 per cent of dibromofluoranthene of melting point 190–197° C. is obtained respectively.

Example 4

Into 101 parts of fluoranthene in 600 parts of nitrobenzene there are allowed to run drop by drop 175 parts of bromine dissolved in 300 parts of nitrobenzene. After stirring for 24 hours the nitrobenzene is distilled with steam and the residue dried. By recrystallizing the product from 10 times its weight of chlorobenzene there is obtained a yield of 60 per cent of dibromofluoranthene which melts at 195–200° C.

Example 5

Into a solution of 40.4 parts of fluoranthene in 360 parts of nitrobenzene there are allowed to run drop by drop while stirring 67 parts of bromine in 60 parts of nitrobenzene. After 48 hours the hydrogen bromide is removed by blowing air through the mass and the separated crude dibromofluoranthene is dissolved by heating the whole to about 120° C. On cooling, dibromofluoranthene of melting point 198–201° C. crystallizes in a yield of 60 per cent.

By using 70 parts of bromine there is obtained a yield of 62 per cent a product melting at 197–200° C.

What we claim is:

1. Process for the manufacture of dibromofluoranthenes, comprising reacting fluoranthene with an appropriate proportion of bromine in presence of nitrobenzene.

2. Process for the manufacture of dibromofluoranthenes, comprising reacting fluoranthene with bromine in presence of nitrobenzene, then separating the hydrogen bromide from the reaction medium, heating the said medium until the dibromofluoranthene contained therein has passed into solution and allowing the solution to cool.

WALTER KERN.
THEODORE HOLBRO.
RICHARD TOBLER.